(12) United States Patent
Chan

(10) Patent No.: US 7,149,152 B1
(45) Date of Patent: Dec. 12, 2006

(54) PROJECTION CLOCK

(75) Inventor: Raymond Chan, Hong Kong (HK)

(73) Assignee: IDT Technology Limited, Kowloon (HK)

(*) Notice: Subject to any disclaimer, the term of this patent is extended or adjusted under 35 U.S.C. 154(b) by 7 days.

(21) Appl. No.: 11/190,975

(22) Filed: Jul. 28, 2005

(51) Int. Cl.
G04B 19/00 (2006.01)
G04C 17/00 (2006.01)
G04B 47/00 (2006.01)

(52) U.S. Cl. ............................ 368/79; 368/10; 368/239
(58) Field of Classification Search ................. 368/10, 368/67, 76, 79, 82, 88, 227, 2
See application file for complete search history.

(56) References Cited

U.S. PATENT DOCUMENTS 2,290,811 A * 7/1942 Nassoit ........................ 368/76
2,486,425 A * 11/1949 Siegmund et al. ............ 353/40
2,875,668 A * 3/1959 Stuart ........................... 368/76
3,136,210 A * 6/1964 Barrett ......................... 368/79
5,247,492 A * 9/1993 Pan .............................. 368/79
6,798,720 B1 * 9/2004 Haupt et al. ................. 368/79

* cited by examiner

Primary Examiner—Vit Miska
Assistant Examiner—Thanh S. Phan
(74) Attorney, Agent, or Firm—Leydig, Voit & Mayer, Ltd.

(57) ABSTRACT

A projection clock includes a base unit that includes a power supply, a clock circuit powered by the power supply, and a wireless transmitter for wirelessly transmitting time information provided by the clock circuit. Also, a projection unit, separate from the base unit, includes a projection circuit and a wireless receiver for wirelessly receiving the transmitted time information, based on which the projection circuit operatively projects the time.

15 Claims, 4 Drawing Sheets

PROJECTION CLOCK

The present invention relates to a projection clock.

BACKGROUND OF THE INVENTION

Projection clocks are known to include an LCD projector for projecting the time upon a surface such as a bedroom ceiling. It can be difficult to set such clocks upon the bedside table for example in such manner that its front panel time display and controls are easily viewed and accessed on the one hand, and that the projected time displayed on the ceiling is optimised in size, low distortion and orientation for viewing on the other hand.

OBJECTS OF THE INVENTION

It is an object of the present invention to overcome or substantially ameliorate the above disadvantage.

SUMMARY OF THE INVENTION

According to the invention, there is provided a projection clock comprising a base unit that includes power supply means, a clock circuit powered by way of the power supply means, and a wireless transmitter for wirelessly transmitting time information provided by the clock circuit. Also comprised is a projection unit separate from the base unit, which includes a projection circuit and a wireless receiver for wirelessly receiving said time information, based on which the projection circuit operatively projects the time.

Preferably, the base unit has a portion for locating the projection unit sufficiently close to the base unit for receiving said time information therefrom.

More preferably, the portion of the base unit comprises a cradle.

More preferably, the base unit includes detecting means for detecting locating of the projection unit by the base unit and then activating the transmitter.

In a preferred embodiment, the transmitter comprises radio frequency transmitter and the receiver comprises radio frequency receiver.

In a preferred embodiment, the projection unit includes a rechargeable power storage device for powering the projection circuit, and the base unit includes a charging device powered by way of the power supply means for charging the power storage device.

More preferably, the projection unit includes a low battery detection circuit for detecting a low battery status of the power storage device and providing a signal indicative of the low battery status.

Further more preferably, the signal comprises an icon associated with the time projected by the projection circuit.

It is preferred that the charging device includes a first contact at the base unit and a second contact at the projection unit connected to the power storage device, the first and second contacts being arranged for connection upon placing of the projection unit with the base unit.

It is preferred that the charging device comprises a first part at the base unit connected to the power supply means and a second part at the projection unit connected to the power storage device, the first and second parts operatively interacting with each other inductively.

It is further preferred that the base unit has a portion for locating the projection unit at such a position that it can receive said time information from the base unit and be charged by the charging device thereof.

It is yet further preferred that the base unit includes detecting means for detecting locating of the projection unit by the base unit and then activating the transmitter, the detecting means comprising the first part of the charging device.

Advantageously, the projection unit has no operating key or button accessible on the outside.

It is preferred that the projection unit is generally spherical having a lower portion including a plurality of small flat regions inclined at different angles, on which the projection unit can rest to project time at different angles.

It is further preferred that the base is generally rectangular including a generally part-spherical recess in its upper surface for locating the projection unit.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
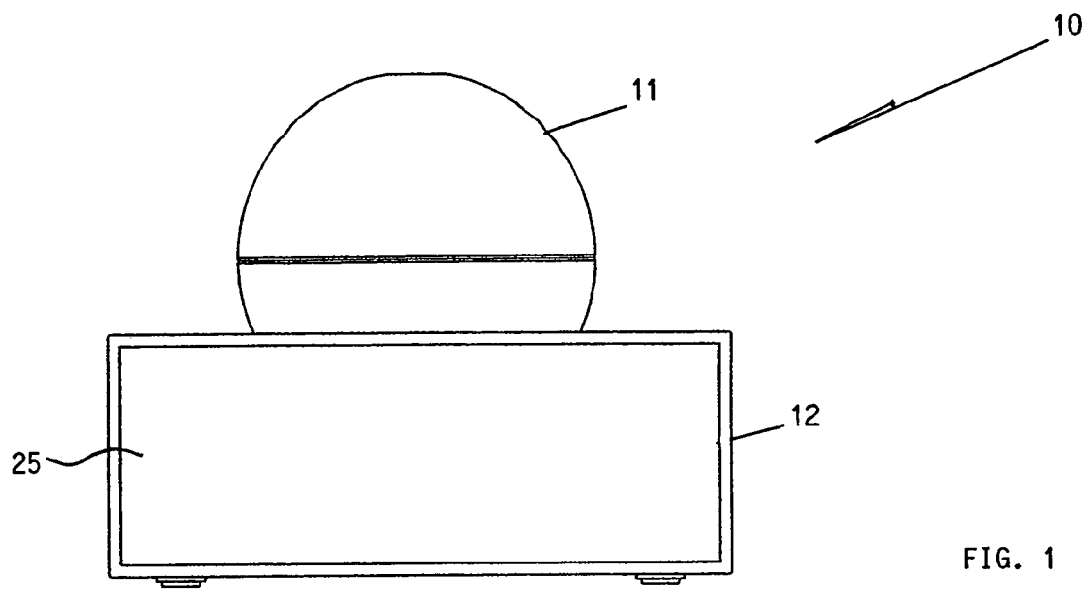
FIG. 1 is a front view of an embodiment of a projection clock in accordance with the invention, said clock having a base unit and a projection unit resting thereon.
Figure 2:
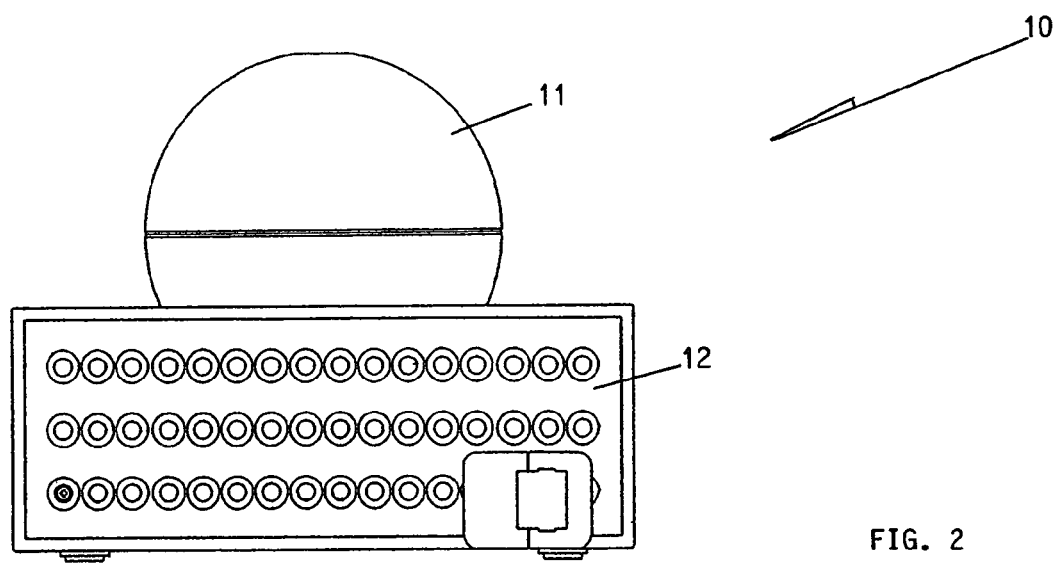
FIG. 2 is a rear view of the projection clock of FIG. 1.

Referring to the drawings, there is shown a projection clock 10 embodying the invention, which has a generally spherical projection unit 11 that can be seated upon a generally rectangular base unit 12. The base unit 12 has a central part-spherical recess 12A in its top surface that acts as a cradle for locating the projection unit 11. However, the projection unit 11 can be removed from the base unit 12 and set down on a horizontal surface such as a desktop, at a location remote from the base unit 12.

The projection unit 11 projects a time image generally upwards. Its spherical body has a series of three small flat regions 11A, 11B and 11C from the bottom, which extend, or are inclined, horizontally and at 30° and 60° upwards respectively such that the projection unit 11 can rest on the desktop to project a time image selectively at an angle of 90°, 60° or 30° from the desktop.

The projection unit 11 incorporates a MCU (microprocessor control unit) 15 for general operations and control including clock functions, and is powered by a built-in regulator 13 controlled by the MCU 15. The regulator 13 is located generally at the bottom of the spherical body for inductive energization (without electrical contact) by the base unit 12 when the projection unit 11 is resting thereon. The regulator 13 includes an induction coil 13A for receiving power by induction, a diode circuit 13B for current rectification, a rechargeable battery 13C for power storage and a regulating circuit 13D for the output.

The projection unit 11 includes a transparent LCD panel 17 extending across the top part of the spherical body, and a projection LED (with driver circuit) 17A located behind the LCD panel 17, both being controlled by the MCU 15. In operation, the LCD panel 17 receives a time signal from the MCU 15 and then turn on the appropriate LCD segments (or matrix dots) for time indication, with the projection LED 17A emitting a bright red light beam therethrough to project a time image onto the ceiling or a wall. An adjustable lens covers the LCD panel 17 for focusing the light beam to produce a sharp image.

There is a low battery detection circuit 16 controlled by the MCU 15 for detecting and indicating a low battery status of the battery 13C, for example by flashing a flat-battery icon in the projected time image. An internal power key 18 allows the power to be switched off (and on), which can only be accessed by opening the spherical body.

Apart from the power key 18 which is hidden anyway, the projection unit 11 has no operating keys or buttons accessible on the outside such that its operation cannot be interfered or altered by a user when used in isolation. The situation is different when the projection unit 11 sits on the base unit 12, where it is able to accept data and/or control by means of an internal RF receiver (with an antenna) 14 connected to the MCU 15.

The base unit 12 incorporates an MCU 21 for general operations and control including clock functions, and an LCD display 25 illuminated by an LED backlight circuit 19 for displaying time, etc. The panel of the LCD display 25 also provides five contactless (touch-screen) keys 27 to enable control and data input from a user. The MCU 21 controls a music IC 22 to generate melody and polyphonic alarm sounds via a built-in speaker 23 for the clock. A built-in temperature sensor 24 gathers and provides temperature information to the MCU 21 for displaying indoor temperature on the LCD display 25, whereas outdoor temperature may be measured using a remote (wireless) sensor.

The base unit 12 further includes an RF (radio frequency) clock 26 which receives and synchronizes with the radio time/calendar signals broadcast by the local authority of the country or time zone concerned, such as a remote atomic time transmitter, for indicating time/date on the LCD display 25 under the control of the MCU 21. European version of the subject clock is tuned to receive DCS/MSF signals, whereas US version receives wwvb signals.

There is a DC jack 30 for receiving DC power from an external power source to supply power, via three regulating circuits 31 of different voltages as required, to the various parts and components of the system including the projection unit 11 via induction.

To supply electrical power to the projection unit 11, the base unit 12 employs a DC-AC converter 20 which includes an induction coil 20A located adjacent the recess 12A for electro-magnetic interaction with the induction coil 13A of the projection unit 11. The converter 20 operates based on oscillation provided by an oscillation circuit 29 which is also controlled by the MCU 21. Immediately upon the projection unit 11 being placed (in the cradle 12A) on the base unit 12, power is delivered inductively across the coils 20A and 13A for charging the battery 13C in the regulator 13.

While being placed together, apart from charging the projection unit 11, the base unit 12 will also automatically establish wireless communication with the projection unit 11 primarily for synchronization of time. This is achieved by an internal RF transmitter (with an antenna) 28 of the base unit 12, which is coupled with the RF receiver 14 of the projection unit 11 for transmitting wireless RF control and/or data signals thereto.

A sudden rise in the load current drawn by the converter 20 is an indication that the projection unit 11 is placed on the base unit 12, as detected by the MCU 21 which will then activate the RF transmitter 28 and/or send time sync information thereto for transmission. Based on the official time maintained by the radio controlled clock 26, the base unit 12 adjusts the time of the projection unit 11 each time the projection unit 11 is placed on it. The keys 27 on the display 25 of the base unit 12 may be used to switch the projection unit 11 on and off, while the latter is at home.

Placing of the projection unit 11 on the base unit 12 is detected via the converter 20. Alternatively, a micro-switch fitted adjacent the cradle 12A may be used to detect the projection unit 11 upon being pressed thereby, or a reed switch under the cradle 12A for closing by a magnet fixed inside the projection unit 11. The cradle 12A locates or positions the projection unit 11 sufficiently close to the base unit 12 such that the power rating of the transmitter 28 and receiver 14 can be minimal.

In operation, the projection unit 11 will turn on for continuous time image projection when it is removed from the base unit 12. The speaker 23 will beep once when the projection unit 11 is placed correctly on the base unit 12 i.e. in the cradle 12A. The projection unit 11 can be set upon the top of a cupboard or at some location remote from the base unit 12 so that it can be arranged to project an easily-read image on the ceiling independently of the bed position or orientation of the base unit 12.

Figure 3:
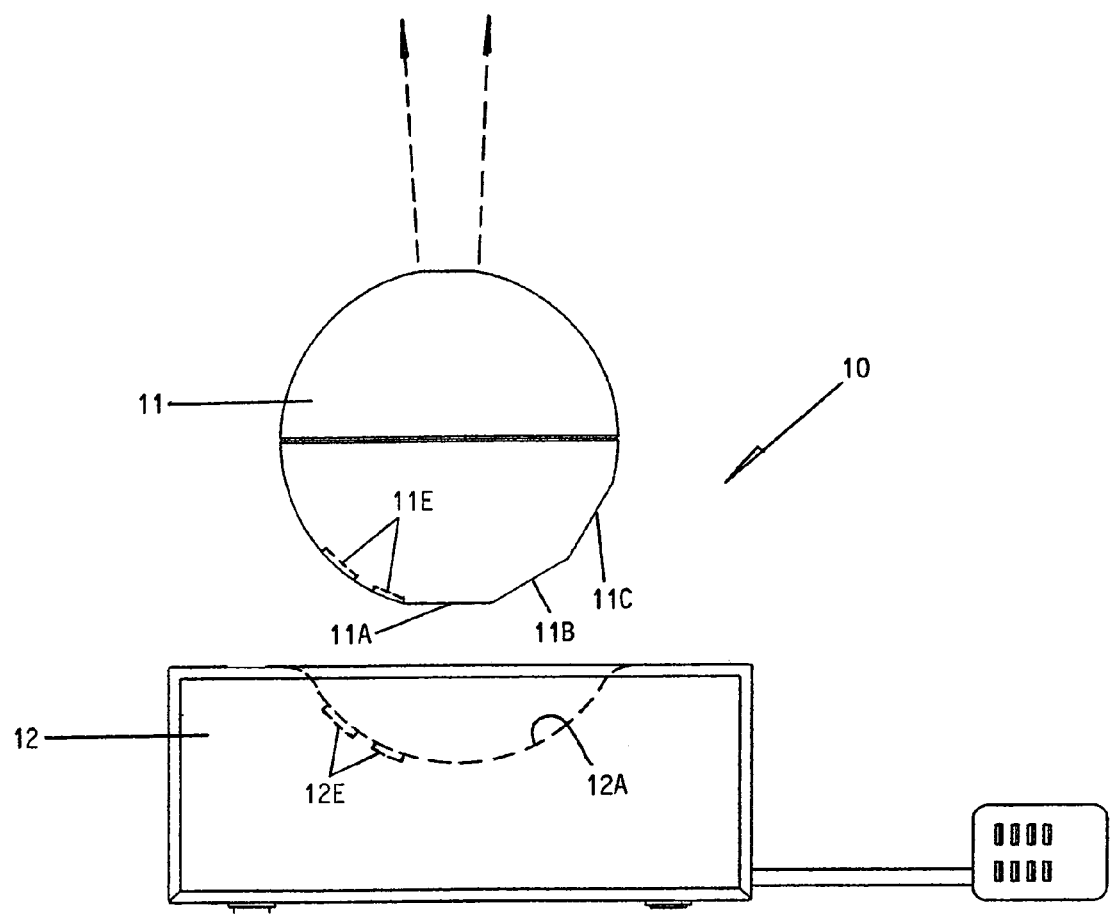
FIG. 3 is a front view similar to FIG. 1, showing the projection unit lifted from the base unit.
Figure 4:
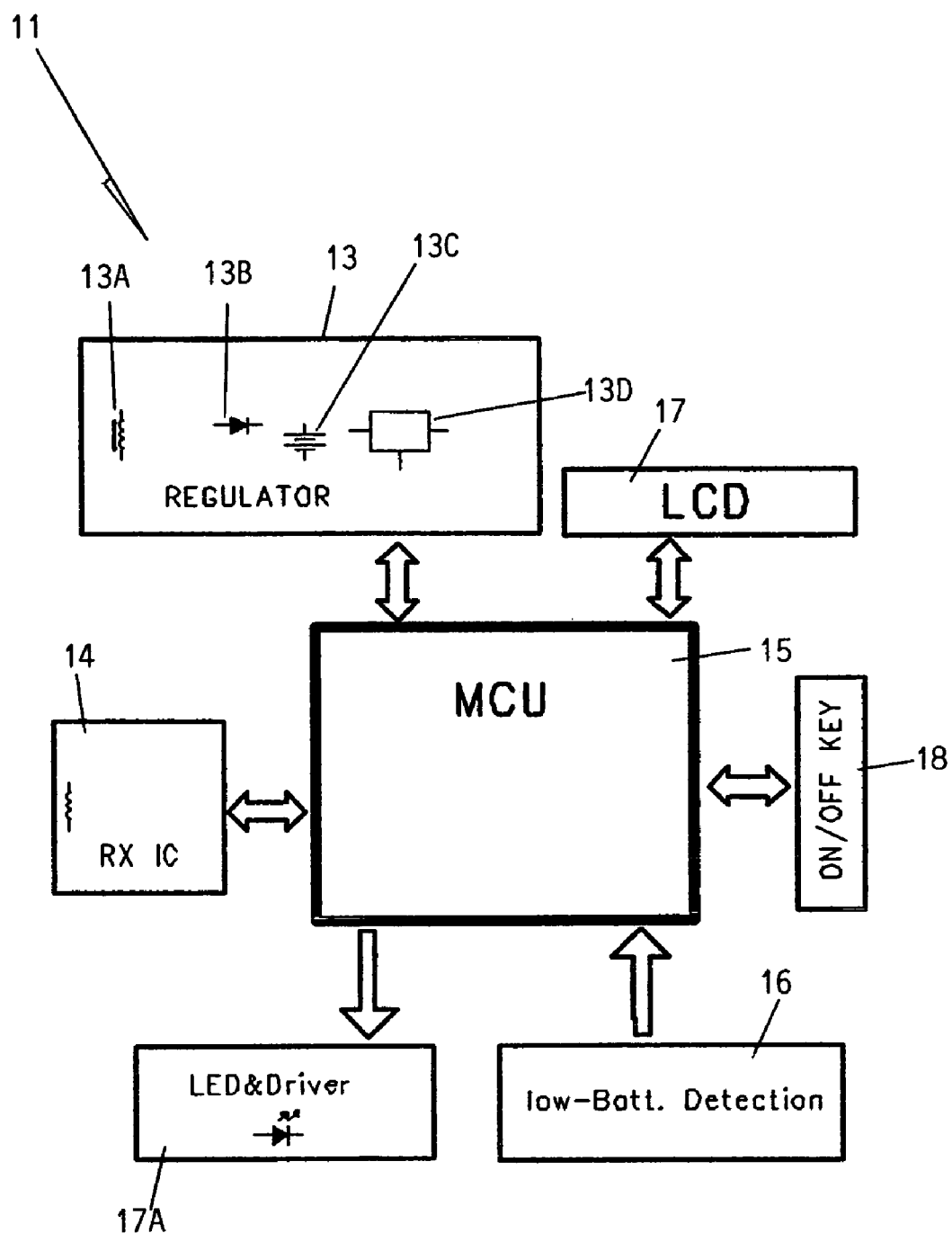
FIG. 4 is a schematic circuit diagram of various components of the projection unit.
Figure 5:
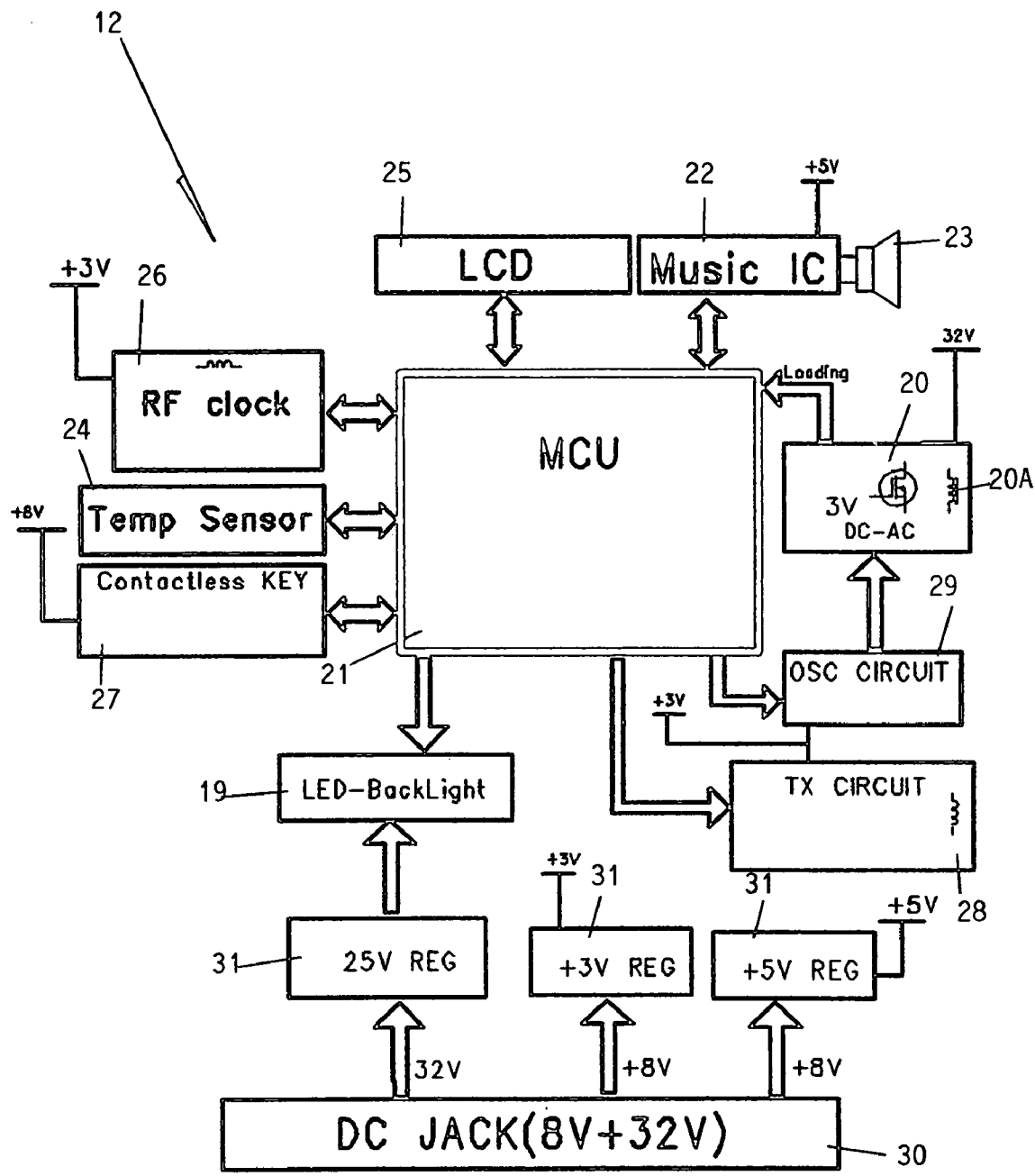
FIG. 5 is a schematic circuit diagram of various components of the base unit.

In a slightly different embodiment, electrical power from the base unit 12 to the projection unit 11 (for charging the latter's battery 13C) may be supplied via physical contact connection, instead of by way of electro-magnetic induction as described above. In this case, the bottom of the projection unit 11 and the cradle 12A of the base unit 12 are provided with respective pairs of aligned metal contacts 11E and 12E (see FIG. 3) for electrical connection upon the projection unit 11 being placed on the base unit 12 (i.e. resting in the cradle 12A). The base unit contacts 12E may extend as circles co-axially about the cradle 12A such that the other pair of contacts 11E may make contact with them irrespective of the orientation of the projection unit 11, or certain positioning means may be utilized to fix the position of the projection unit 11 in the cradle 12A, such as a pair of complementary bump and dimple.

To implement contact charging, the aforesaid converter 20 and oscillation circuit 29 in the base unit 12 should be replaced by a charging circuit of a typical battery charger, whose output is connected to the base unit contacts 12E. With regard to the projection unit contact 11E, they may be connected directly to the battery 13C.

The invention has been given by way of example only, and various other modifications of and/or alterations to the described embodiment may be made by persons skilled in the art without departing from the scope of the invention as specified in the appended claims.

For example, the base unit may include a humidity sensor and the projection unit may project the temperature and humidity readings alongside the time.

The invention claimed is:

1. A projection clock comprising:
   a base unit including power supply means, a clock circuit powered by way of the power supply means, and a wireless transmitter for wirelessly transmitting time information, including time, provided by the clock circuit; and
   a projection unit separate from the base unit, including a projection circuit and a wireless receiver for wirelessly receiving the time information, based on which the projection circuit operatively projects the time onto an external surface that is not a part of said base unit or said projection unit.

2. The projection clock as claimed in claim 1, wherein the base unit has a portion for locating the projection unit sufficiently close to the base unit for receiving the time information from the base unit.

3. The projection clock as claimed in claim 2, wherein the portion of the base unit comprises a cradle.

4. The projection clock as claimed in claim 2, wherein the base unit includes detecting means for detecting locating of the projection unit on the base unit and thereafter activating the transmitter.

5. The projection clock as claimed in claim 1, wherein the transmitter comprises a radio frequency transmitter and the receiver comprises a radio frequency receiver.

6. The projection clock as claimed in claim 1, wherein the projection unit includes a rechargeable power storage device for powering the projection circuit, and the base unit includes a charging device powered by the power supply means for charging the power storage device.

7. The projection clock as claimed in claim 6, wherein the projection unit includes a low battery detection circuit for detecting a low battery status of the power storage device and providing a signal indicative of the low battery status.

8. The projection clock as claimed in claim 7, wherein the signal comprises an icon associated with the time projected by the projection circuit.

9. The projection clock as claimed in claim 6, wherein the charging device includes a first contact at the base unit and a second contact at the projection unit connected to the power storage device, the first and second contacts being arranged for connection upon placing of the projection unit on the base unit.

10. The projection clock as claimed in claim 6, wherein the charging device comprises a first part at the base unit connected to the power supply means and a second part at the projection unit connected to the power storage device, the first and second parts operatively interacting with each other, inductively.

11. The projection clock as claimed in claim 10, wherein the base unit has a portion for locating the projection unit at a position so that the projection unit can receive the time information from the base unit and be charged by the charging device.

12. The projection clock as claimed in claim 11, wherein the base unit includes detecting means for detecting locating of the projection unit on the base unit and thereafter activating the transmitter, the detecting means comprising the first part of the charging device.

13. The projection clock as claimed in claim 1, wherein the projection unit has no operating key or button accessible on the outside.

14. The projection clock as claimed in claim 1, wherein the projection unit is generally spherical and has a lower portion including a plurality of flat regions inclined at different angles, on which the projection unit can rest to project the time at different angles.

15. The projection clock as claimed in claim 14, wherein the base is generally rectangular and includes a partly spherical recess in an upper surface for locating the projection unit.

* * * * *